United States Patent Office 3,497,272
Patented Feb. 24, 1970

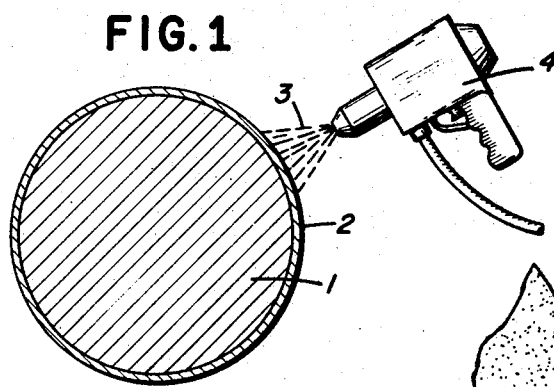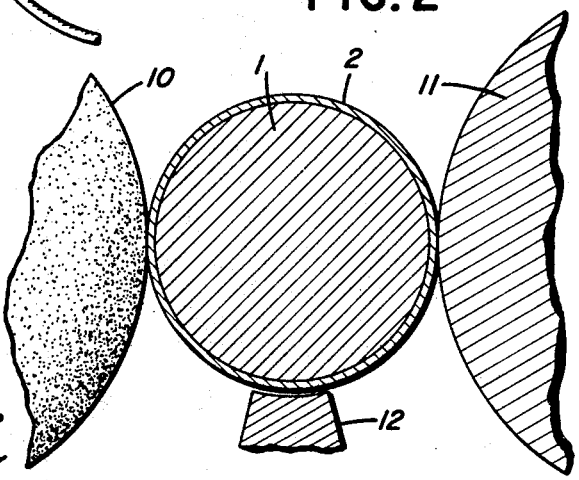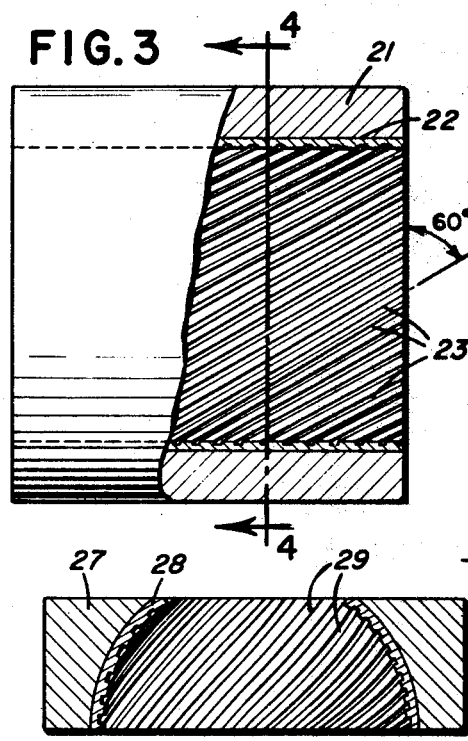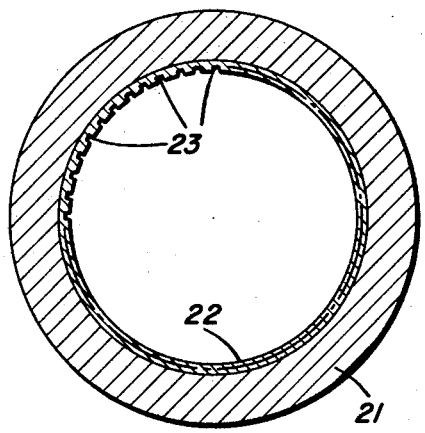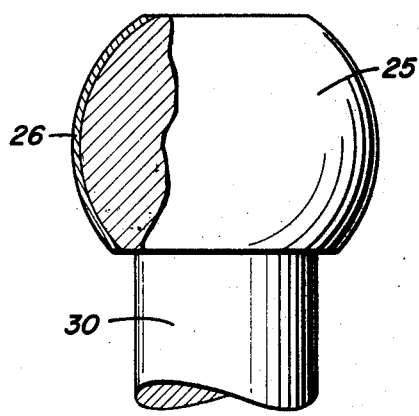

3,497,272
FRICTION ELEMENTS FOR MACHINES SUBJECTED TO HIGH LOADS
Jacques Jean Caubet, Saint-Etienne, Loire, France, assignor to Automobiles M. Berliet, Lyon, Rhone, France, and Hydromecanique et Frottement, Saint-Etienne, Loire, France, both French corporations
Filed June 20, 1966, Ser. No. 558,558
Int. Cl. F16c *17/00, 33/00*
U.S. Cl. 308—3         11 Claims

ABSTRACT OF THE DISCLOSURE

Friction between two contacting metal surfaces movable relative to one-another such as shafts, slide blocks and like, is reduced by coating one metal surface with a layer of molybdenum while the other surface is formed of cold-hardened copper or cuprous alloy and contains a plurality of grooves which are inclined at an angle of from 45° to 90° with the direction of movement of the two surfaces. The molybdenum coating is preferably applied by a metallizing spray in the known manner, whereas the cuprous surface is preferably formed by electroplating, if the base is another metal. One or both of these surfaces may be superficially modified by treatment with sulfur, tellurium or selenium.

---

Such assemblies permit operation of heavy duty machinery without maintenance lubrication at high unit pressures, in the order of 100 kg./cm.$^2$ and high linear speeds such as more than 4 meters per minute.

Various industries make use of cumbersome machines having parts which rotate or slide slowly whilst transmitting considerable loads. Such machines, for example cement furnaces, foundry converters and crushing machines, are at present equipped with bearings of which the shaft, which may be a foot or more in diameter, transmits loads of several tens of tons and rotates at a few revolutions per minute.

For various professional, economic or geographical reasons, such as the lack of qualified manpower, prohibitive cost of the undertaking or distance from industrial sources, one seeks to obtain simplification or even elimination of the lubrication of these parts.

The more or less satisfactory solutions at present known require either the use of very large bearings or the application of special long-lasting lubricants.

The present invention concerns friction elements of machines slidable one upon the other or rotating one inside the other, such as slide blocks or rollers and the slide surfaces, cams, rods, levers or rollers co-operating with them, swivel joints and their housings, shafts, spindles or pivots and their supports, and the like.

According to the invention, one of these co-operating friction elements is covered with a layer of molybdenum applied by metallisation, the friction surface of the other element being essentially made of a cuprous metal, and the friction surface comprising said cuprous metal being subjected to milling or hammering in such a manner that grooves strongly inclined to the direction of movement of sliding or rotation are formed.

It is to be understood that the term cuprous metal is employed to designate copper or a copper alloy containing a major part of copper.

Preferably, the angle which the grooves form with the direction of friction will be comprised between 60 and 90°, but will in no case below 45°.

The friction elements according to the invention have in particular the advantages indicated hereinafter.

Since the crystalline structures of copper and of molybdenum are dissimilar, which limits considerably the phenomena of adherence between these two metals, the friction and consequently the wear of the friction elements is practically negligible. Furthermore, the low coefficient of friction reduces the quantity of heat produced.

Moreover, the porous structure of metallised molybdenum makes it possible to keep in reserve a portion of the lubricant that may be applied on assembly.

The layer of molybdenum may be applied with the aid of any suitable known type of metallising spray gun such as those applying the metal in the form of powder or a filament.

When a layer of copper is used, this may be obtained with the aid of conventional alkaline or acid/electrolytic copper plating baths or even two in succession. In the case where it is desired to limit the copper plating to single friction surfaces, the other surfaces will be protected in known manner by a protective varnish previously applied.

The pieces covered with molybdenum and with a cuprous metal are generally made of steel, but, as it will be shown hereinafter, other metals may be employed. The element the friction surface of which is in a cuprous metal, e.g. may be entirely made of this cuprous metal.

It is evident that generally speaking the friction elements are made of metals which respond to the mechanical requirements imposed by the operation of the machines in which they are mounted and that they are capable of being subjected to suitable treatment as described above, as to the treatments which will be described hereinafter.

The surfaces to be covered must be subjected, prior to metallisation or copper plating, to one or more of the preparatory treatments normally used in the technique of metal sheating, such as sanding, polishing, degreasing, cleaning, etc.

According to a further feature of the invention and in the case of particularly severe operating conditions, the surfaces in contact with the said friction elements may be subjected at assembly to a single initial lubrication with the aid of a high pressure lubricant.

The advantages of certain disulphides as lubricants are known, such as those of molybdenum, tungsten or zirconium which, when applied to friction elements, considerably diminishes their coefficients of friction. The adherence of thin layers of solid lubricant and the longevity are improved and even doubled. Unfortunately, the use of these dry lubricants is extremely difficult.

According to one of the improvements according to the invention, one or the other of the two friction elements or both, contains a sulphide at least superficially in the friction layers. Preferably, this sulphide is made in situ, that is to say it is obtained by the action of a suitable bath or atmosphere on molybdenum or on the copper or on both metals, this action having the effect of producing the sulphide right inside the metal by reaction of the sulphur or one of these compounds.

Suitable salt baths are those containing, for example, one or more of compounds or elements such as cyanides, cyanates, sulphates, hyposulphites, sulphides, sulphocyanates, alkaline chlorides and carbonates, or sulphur, the treatment temperature being between 400 and 1000° C. One process which gives good results is, for example, that which is known commercially under the name "Sulfinuz process." According to this process, the piece to be treated, after preheating at about 300 to 350° C., is immersed for 20 minutes to 6 hours in a salt bath maintained at a temperature of approximately 570° C. and composed of an inactive base such as chlorides and carbonates of alkaline and alkaline earth metals, in sufficient quantity to obtain a melting point below 500° C., active sulphurised compounds and cyanide or cyanate buffers in sufficient quantity to protect the sulphurised compounds and maintain the bath in a reducing medium.

If one resorts to treatment by gaseous atmosphere, the sulphurising agent may be, for example, carbon disulphide, hydrogen sulphide, sulphurous anhydride, among others, at a temperature between 400 and 1000° C. depending on the gas chosen, the treatment time being between 20 minutes and several hours, for example one hour.

It is obvious that the sulphurising treatment is applied only to the copper element in the case where it would not be applicable to molybdenum.

According to one variation, it is also possible to use, instead of an element sheathed with an electrolytic copper deposit, an element made of solid copper alloy containing sulphur alone or sulphur, selenium and tellurium.

Another improvement according to the invention consists in making the copper element of a metal having a low Young's modulus.

For example, where a shaft has to be rotated in a bearing under hazardous lubricating conditions or without lubrication, the choice will be to have the shaft made of carbon steel, steeped before metallisation, while the sleeve will be turned of a light alloy and then covered with copper. It must be understood that these coatings can only be produced after preparation of the surface of the light alloy. Generally, this preparatory treatment comprises deposition by displacement, that is to say without electric current, of metals more electronegative than aluminium, namely metals such as zinc for example.

Thus in addition to the economy achieved, the low Young's modulus of the light alloy enables the provision of bearing surfaces capable of more extensive elastic deformation and thus renders the bearings less susceptible to possible loss of alignment of the machines.

There are cases where electrolytic copper plating of one of the two friction surfaces in contact cannot be envisaged. This is the case, for example, with sleeves of springs engaged in the eye of plate springs and oscillating about a shaft connected to the chassis of a vehicle, which sleeves must be formed on assembly after they have been put in place. These sleeves must be made of a soft material such as bronze. Now on the one hand the friction which consists under known conditions between bronze and molybdenum gives very unsatisfactory results with regard to wear and seizing, and on the other hand the sleeve cannot be subjected to a surface treatment the result of which would be destroyed in the process of the indipensable redrilling operation.

According to one variation of the invention, which overcomes these disadvantages, the copper treatment is carried out on the friction surface of a first element made of copper alloy, sliding on the second element covered with molybdenum or turning in the latter while subjecting to friction under pressure the said friction surface which has previously been lubricated with the aid of a lubricant the solid form of which is a lithium soap.

It has been found that when two friction surfaces in contact, one of which is bronze, are lubricated with a lubricant the gel of which is a lithium soap, the bronze quickly becomes covered with pure copper under the combined action of friction and lubricant. This is particularly surprising since the known bronzes become covered either with tin or with lead when their surface is subjected to harsh wear.

Thus if the friction of molybdenum on bronze is harmful as regards wear and seizing, remarkable results are obtained by lubricating with a grease the gel of which is a lithium soap, since the friction of molybdenum on bronze is transformed very quickly into a friction of molybdenum on practically pure copper.

Three embodiments of the friction elements according to the invention will now be described by way of example.

The first case is a steel shaft 300 mm. in diameter, rotating at a speed of 4 r.p.m. in a support under a load, assumed to be uniformly distributed, of 800 kg./cm.² The shaft is covered by metallization with a layer of molybdenum of about 0.5 mm. thickness and then ground. The support, consisting of a semi-hard steel bearing, that is to say of non-alloyed steel having a carbon content between 0.3 and 0.4% by weight, of a length of 350 mm., has been covered with an electrolytic deposit of about $15\mu$ of copper on the surface which is to be in contact with the shaft, and milled on the inside with grooves inclined about 60° to the direction of the envisaged movement.

The second case was a ball and socket joint of 40 mm. diameter, the convex piece of steel was metallized with molybdenum. The two cups between which the convex piece is housed, made of tempered XC 45f steel that is to say non-alloyed steel containing by weight 0.45% C, $P \leqslant 0.04\%$, $S \leqslant 0.035\%$ and $S+P \leqslant 0.065\%$, were covered on the inside with an electrolytic copper deposit of a thickness of about 0.04 mm., and milled as indicated above.

In the third case, a steel sleeve covered by electrolysis with a copper layer of about 0.1 mm. in thickness and milled was treated by the "Sulfinuz" process mentioned above, the immersion in the bath lasting about 25 minutes. In this sleeve rotated in the dry state a steel shaft covered with an about 0.1 mm. thick layer of molybdnum applied with a metallization spray gun.

Finally, in a fourth case a ring having an internal diameter of 40 mm. and length of 50 mm., made of a copper alloy containing about 88% copper and 12% tin, was milled on the inside with grooves inclined about 60° to the direction of envisaged movement, these grooves having a depth of about 0.1 mm. and being spaced apart about 1.5 mm. A non-alloyed steel shaft of type XC 32f according to French standard NF A 02–001 was coated by metal spraying with a layer of about 0.1 mm. of molybdenum and then ground. The shaft mounted in the ring with a clearance of 0.1 mm. could oscillate in water without the application of grease for 500 hours without showing appreciable signs of wear. The frequency of oscillation was 1 Hz., the amplitude of oscillation 100°, the load on the shaft in the ring was about 15,000 N and the coefficient of friction 0.2.

These embodiments are shown more or less diagrammatically in the accompanying drawings wherein:

FIG. 1 shows the application of a molybdenum layer to a machine element by spray metallization;

FIG. 2 shows machining such metallized layer to secure the desired bearing surface;

FIG. 3 shows a cylindrical element partially cut away to reveal the copper bearing layer forming the inner surface thereof;

FIG. 4 is a transverse view of the element of FIG. 3 along the line 4—4; and

FIG. 5 shows two elements forming a swivel joint.

In FIG. 1, a rod or shaft 1 of steel in the like metal is coated with a layer 2 of molybdenum by spray 3 from a metallizing gun 4 in the conventional manner.

After application of the molybdenum layer, the metallized layer is machined to the desired thickness and smoothness in the grinding means 10, 11 and 12, as indicated in FIG. 2.

A cylindrical bearing element is shown in FIGS. 3 and 4, wherein 21 is the sleeve of steel, aluminum or other suitable metal, and 22 represents a lining or bearing surface of copper or a copper alloy. In this embodiment, the cuprous surface is provided with grooves 23, extending across the same at an angle of 60° with respect to the direction of friction as indicated in FIG. 3.

FIG. 5 shows a swivel joint comprising a movable element 30, having a convex portion 25 provided with a layer of molybdenum 26 as the bearing surface. The convex portion 25 of element 30 engages the concave surface 28 of mating element 27. Surface 28 is of copper alloy and is provided with striations or grooves 29 extending across the same at an angle of at least 45° as disclosed above.

The friction elements according to the invention enable a safe functioning of the machines in which they operate without requiring lubrication for maintenance for considerable lengths of time at very high unit pressures, for example higher than 100 kg/cm.², and at very high linear speeds, for example of more than 4 meters per minute.

In some cases said elements can be utilized without single initial lubrication.

What I claim is:

1. Metal friction elements for machines sliding one over the other or rotating one inside the other, wherein the friction surface of one of the elements is covered with a layer of porous molybdenum and the surface of the other elements consists of cold-hardened copper or a copper alloy comprising a major part of copper, and having grooves in said surfaces said grooves having a depth of about 0.1 mm., being spaced apart about 1.5 mm. and extending at an angle of not less than 45° to the direction of movement of said surfaces, one of said friction surfaces containing a member of the group consisting of sulfur, selenium and tellurium.

2. Metal friction elements according to claim 1 wherein the surface containing sulfur is a sulfur-containing copper alloy.

3. Metal friction elements according to claim 1 wherein the molybdenum-surfaced element is a cylinder and the other element is a metal sleeve lined with copper or a copper alloy.

4. Metal friction elements according to claim 1 wherein the molybdenum-surfaced element is a rotatable shaft and the other element is a bearing for said shaft.

5. Metal friction elements according to claim 1 comprising a convex member coated with molybdenum and a concave member coated with copper or a copper alloy engaging said convex member.

6. Metal friction elements according to claim 1, wherein said inclination is about 60°.

7. Metal friction elements according to claim 1, wherein said other surface is copper.

8. Metal friction elements according to claim 1, wherein said other element is a sulphur containing copper alloy.

9. Metal friction elements according to claim 1, wherein said other element is a copper alloy containing sulphur, selenium and tellurium.

10. Metal friction elements according to claim 7, wherein the coppered element is made of a metal having a low Young's modulus, such as a light alloy.

11. Metal friction elements according to claim 1, wherein the friction elements are subjected at assembly to an initial lubrication with the aid of a high pressure lubricant.

References Cited

UNITED STATES PATENTS

| | | | |
|---|---|---|---|
| 1,877,495 | 9/1932 | Cater | 308—240 |
| 3,238,000 | 1/1966 | Muijderman | 308—240 X |
| 727,381 | 5/1903 | Knudson | 308—237 |
| 869,194 | 10/1907 | Norton. | |
| 1,807,166 | 5/1931 | Myers | 308—240 |
| 1,882,956 | 10/1932 | Sadler | 308—240 |
| 2,320,830 | 6/1943 | Ricardo | 308—241 |
| 2,326,426 | 8/1943 | Baker | 308—5 X |
| 2,631,068 | 3/1953 | Saul | 308—5 |
| 2,787,503 | 4/1957 | Palsulich | 308—241 |
| 2,797,300 | 6/1957 | Hawthorne | 75—153 X |
| 2,798,773 | 7/1957 | Walter | 308—3 |
| 2,942,158 | 6/1960 | Hassler | 75—153 X |
| 3,227,237 | 1/1966 | Moreno | 308—72 X |
| 3,285,680 | 11/1966 | Dailey | 308—241 X |

FOREIGN PATENTS

| | | |
|---|---|---|
| 803,084 | 10/1958 | Great Britain. |
| 705,067 | 3/1954 | Great Britain. |

MARTIN P. SCHWADRON, Primary Examiner

L. L. JOHNSON, Assistant Examiner

U.S. Cl. X.R.

75—153; 308—72, 237, 240, 241